(12) United States Patent
Mak

(10) Patent No.: US 6,837,070 B2
(45) Date of Patent: Jan. 4, 2005

(54) HIGH PROPANE RECOVERY PROCESS AND CONFIGURATIONS

(75) Inventor: John Mak, Santa Ana, CA (US)

(73) Assignee: Fluor Corporation, Aliso Viejo, CA (US)

( * ) Notice: Subject to any disclaimer, the term of this patent is extended or adjusted under 35 U.S.C. 154(b) by 7 days.

(21) Appl. No.: 10/276,857
(22) PCT Filed: Jun. 27, 2001
(86) PCT No.: PCT/US01/20633
§ 371 (c)(1), (2), (4) Date: Jul. 3, 2003
(87) PCT Pub. No.: WO02/14763
PCT Pub. Date: Feb. 21, 2002

(65) Prior Publication Data
US 2004/0025535 A1 Feb. 12, 2004

Related U.S. Application Data
(60) Provisional application No. 60/224,958, filed on Aug. 11, 2000.

(51) Int. Cl.⁷ .................................................. F25J 3/00
(52) U.S. Cl. ........................... 62/625; 62/632; 62/635; 62/636
(58) Field of Search ........................ 62/625, 630, 631, 62/632, 635, 636

(56) References Cited

U.S. PATENT DOCUMENTS

| | | | |
|---|---|---|---|
| 4,657,571 A | | 4/1987 | Gazzi ............................. 62/17 |
| 4,705,549 A | * | 11/1987 | Sapper ......................... 62/625 |
| 5,890,378 A | | 4/1999 | Rambo et al. .................. 62/61 |
| 6,116,050 A | * | 9/2000 | Yao et al. ..................... 62/630 |
| 6,601,406 B1 | * | 8/2003 | Deng et al. ................... 62/621 |

* cited by examiner

Primary Examiner—William C. Doerrler
(74) Attorney, Agent, or Firm—Rutan & Tucker, LLP

(57) ABSTRACT

A gas processing plant has a de-ethanizer (106) and a refluxed absorber (103), wherein the absorber (103) operates at higher pressure than the de-ethanizer (106), and wherein at least a portion of the absorber bottoms product (7) is expanded to provide cooling for the absorber reflux stream and/or the distillation column feed stream. Especially contemplated gas processing plants include propane and ethane recovery plants, and where the gas processing plant is an ethane recovery plant, it is contemplated that the ethane product comprises no more than 500 ppm carbon dioxide.

28 Claims, 14 Drawing Sheets

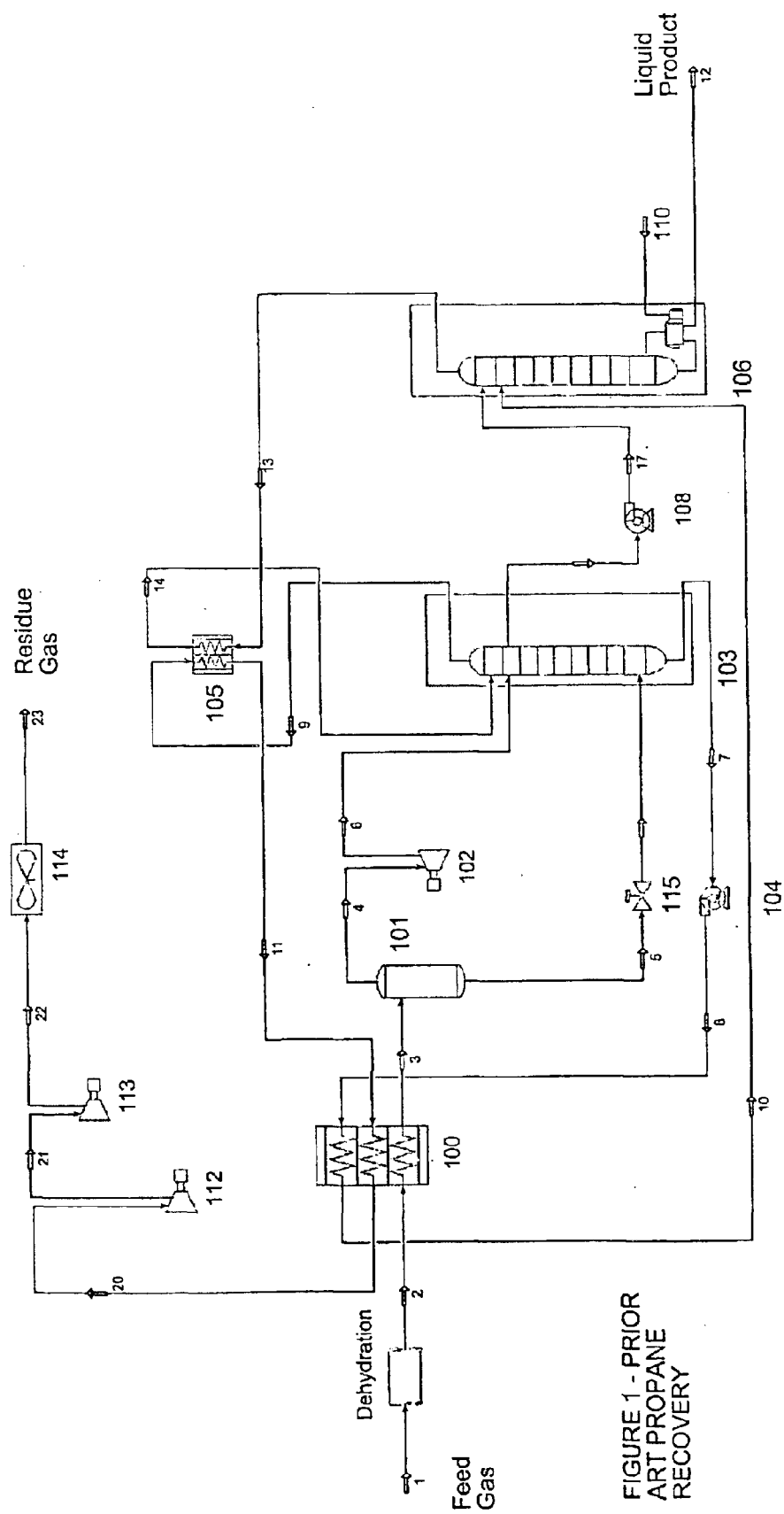

TABLE 1 - STREAM SUMMARY FOR FIGURE 1 PROPANE RECOVERY - PRIOR ART

| Stream Number | 1 | 2 | 3 | 4 | 5 | 6 | 7 | 8 |
|---|---|---|---|---|---|---|---|---|
| Temp., °F | 68 | 67 | -22 | -22 | -22 | -100 | -101 | -100 |
| Pressure, psig | 1300 | 1275 | 1268 | 1268 | 1268 | 449 | 447 | 470 |
| Flow, lbmol/hr | 109,805 | 109,805 | 109,805 | 109,805 | - | 109,805 | 20,796 | 20,796 |

| Stream Number | 9 | 10 | 11 | 12 | 13 | 14 | 17 | 18 |
|---|---|---|---|---|---|---|---|---|
| Temp., °F | -102 | 57 | -25 | 203 | -20 | -75 | -75 | -75 |
| Pressure, psig | 445 | 463 | 440 | 453 | 450 | 445 | 470 | 445 |
| Flow, lbmol/hr | 105,703 | 20,796 | 105,703 | 4,100 | 33,395 | 33,395 | 16,700 | 21,800 |

| Stream Number | 19 | 20 | 21 | 22 | 23 | | | |
|---|---|---|---|---|---|---|---|---|
| Temp., °F | -75 | 24 | 73 | 201 | 110 | | | |
| Pressure, psig | 445 | 433 | 600 | 1315 | 1300 | | | |
| Flow, lbmol/hr | 11,595 | 105,703 | 105,703 | 105,703 | 105,703 | | | |

Key Stream Component Flow (lbmol/hr)

| Stream Number | 1 | 7 | 9 | 12 | 13 | 16 | 17 | 23 |
|---|---|---|---|---|---|---|---|---|
| $CO_2$ | 1,647 | 608 | 1,647 | 0 | 1,446 | | 838 | 1,647 |
| $N_2$ | 471 | 15 | 471 | 0 | 19 | | 3 | 471 |
| $C_1$ | 97,044 | 11,907 | 97,043 | 0 | 19,095 | | 7,188 | 97,043 |
| $C_2$ | 6,582 | 4,217 | 6,528 | 54 | 12,831 | | 8,667 | 6,528 |
| $C_3$ | 2,988 | 2,976 | 13 | 2,975 | 5 | | 4 | 13 |
| $IC_4$ | 327 | 327 | 0 | 327 | 0 | | 0 | 0 |
| $NC_4$ | 488 | 488 | 0 | 488 | 0 | | 0 | 0 |
| $IC_5$ | 125 | 125 | 0 | 125 | 0 | | 0 | 0 |
| $NC_5$ | 124 | 124 | 0 | 124 | 0 | | 0 | 0 |
| $NC_6$ | 9 | 9 | 0 | 9 | | 0 | | |

Recoveries:
Propane 99.5%
Butanes+ 100.0%
Residue Gas Compressor 43,000 HP    43.00 HP/MMscfd

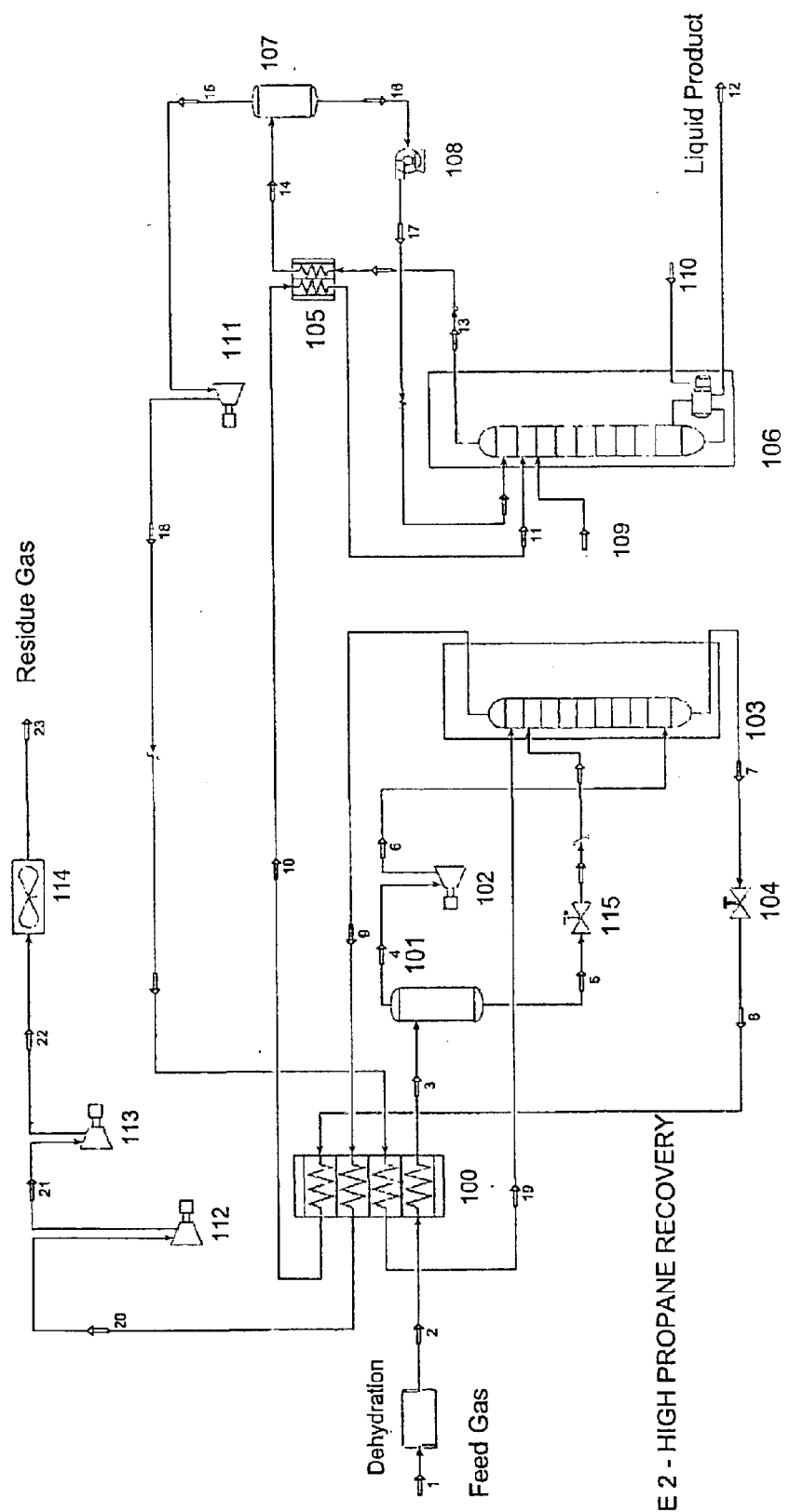
FIGURE 2 - HIGH PROPANE RECOVERY

TABLE 2 - STREAM SUMMARY FOR FIGURE 2 - PROPANE RECOVERY

| Stream Number | 1 | 2 | 3 | 4 | 5 | 6 | 7 | 8 | 9 |
|---|---|---|---|---|---|---|---|---|---|
| Temp., °F | 68 | 67 | -20 | -20 | -20 | -81 | -85 | -103 | -93 |
| Pressure, psig | 1300 | 1275 | 1268 | 1268 | 1268 | 589 | 587 | 420 | 585 |
| Flow, lbmol/hr | 109,805 | 109,805 | 109,805 | 109,805 | 0 | 109,805 | 25,953 | 25,953 | 105,703 |

| Stream Number | 10 | 11 | 12 | 13 | 14 | 15 | 16 | 17 | 18 |
|---|---|---|---|---|---|---|---|---|---|
| Temp., °F | -77 | -37 | 191 | -33 | -54 | -54 | -54 | -53 | -1 |
| Pressure, psig | 413 | 408 | 403 | 400 | 395 | 395 | 395 | 485 | 600 |
| Flow, lbmol/hr | 25,953 | 25,953 | 4,111 | 28,664 | 28,673 | 21,851 | 6,822 | 6,822 | 21,851 |

| Stream Number | 19 | 20 | 21 | 22 | 23 |
|---|---|---|---|---|---|
| Temp., °F | -90 | 62 | 98 | 197 | 110 |
| Pressure, psig | 593 | 575 | 724 | 1315 | 1300 |
| Flow, lbmol/hr | 21,851 | 105,703 | 105,703 | 105,703 | 105,703 |

Key Stream Component Flow (lbmol/hr)

| Stream Number | 1 | 2 | 3 | 4 | 5 | 6 | 7 | 8 | 9 |
|---|---|---|---|---|---|---|---|---|---|
| CO2 | 1,647 | 701 | 1,647 | 0 | 955 | 254 | 254 | 1,647 | 1,647 |
| N2 | 471 | 26 | 471 | 0 | 27 | 1 | 1 | 471 | 471 |
| C1 | 97,044 | 16,057 | 97,048 | 0 | 18,029 | 1,972 | 1,972 | 97,048 | 97,048 |
| C2 | 6,582 | 5,104 | 6,533 | 54 | 9,614 | 4,563 | 4,563 | 6,533 | 6,533 |
| C3 | 2,988 | 2,993 | 4 | 2,985 | 40 | 32 | 32 | 4 | 4 |
| IC4 | 327 | 327 | 0 | 327 | 0 | 0 | 0 | 0 | 0 |
| NC4 | 488 | 488 | 0 | 488 | 0 | 0 | 0 | 0 | 0 |
| IC5 | 125 | 125 | 0 | 125 | 0 | 0 | 0 | 0 | 0 |
| NC5 | 124 | 124 | 0 | 124 | 0 | 0 | 0 | 0 | 0 |
| NC6 | 9 | 9 | 0 | 9 | 0 | 0 | 0 | 0 | 0 |

Recoveries:
Propane          99.9%
Butanes+        100.0%
Residue Gas Compressor   33,320 HP
DeC2 Ovhd Compressor      2,890
Total HP                 36,210        36.21  HP/MMscfd

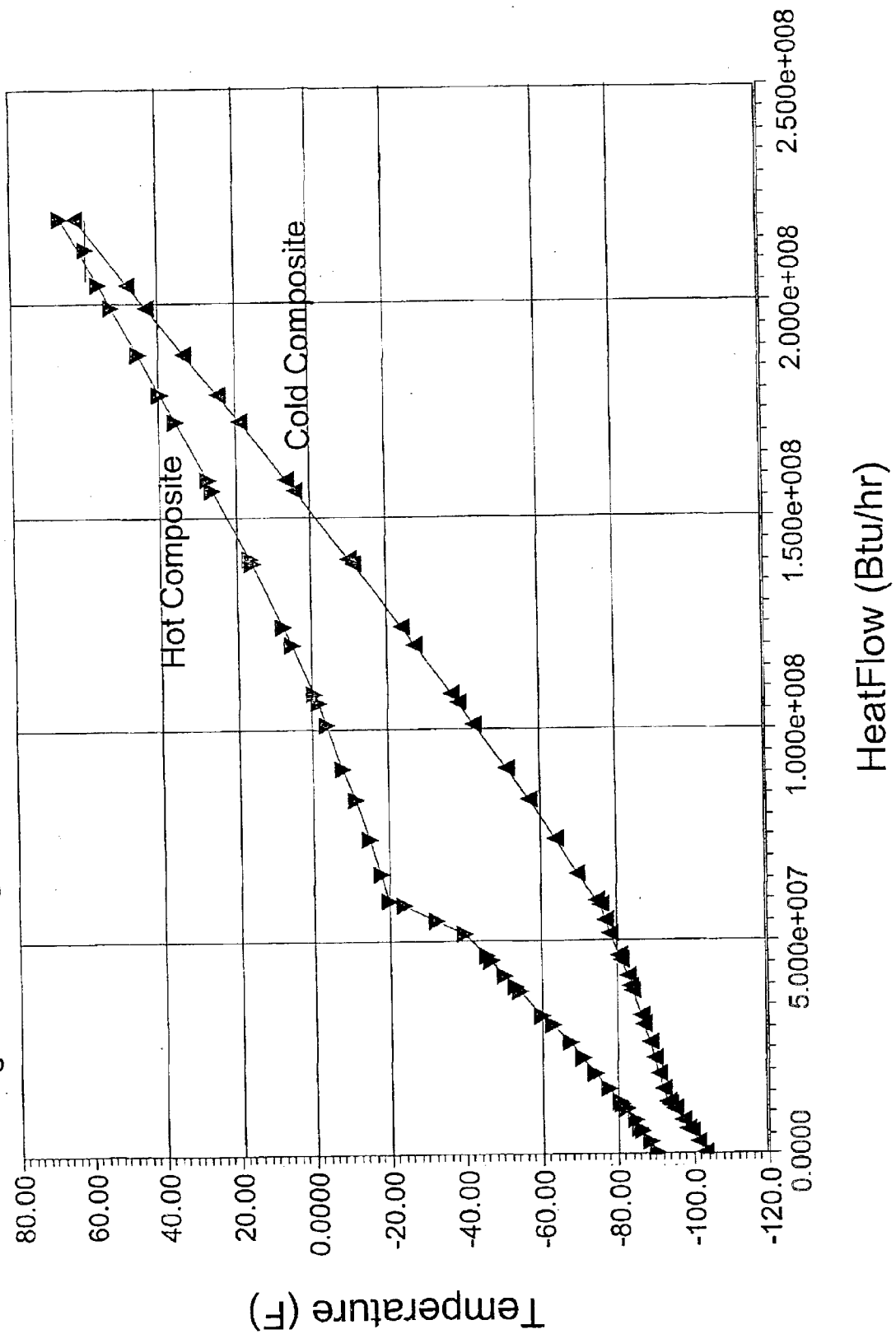

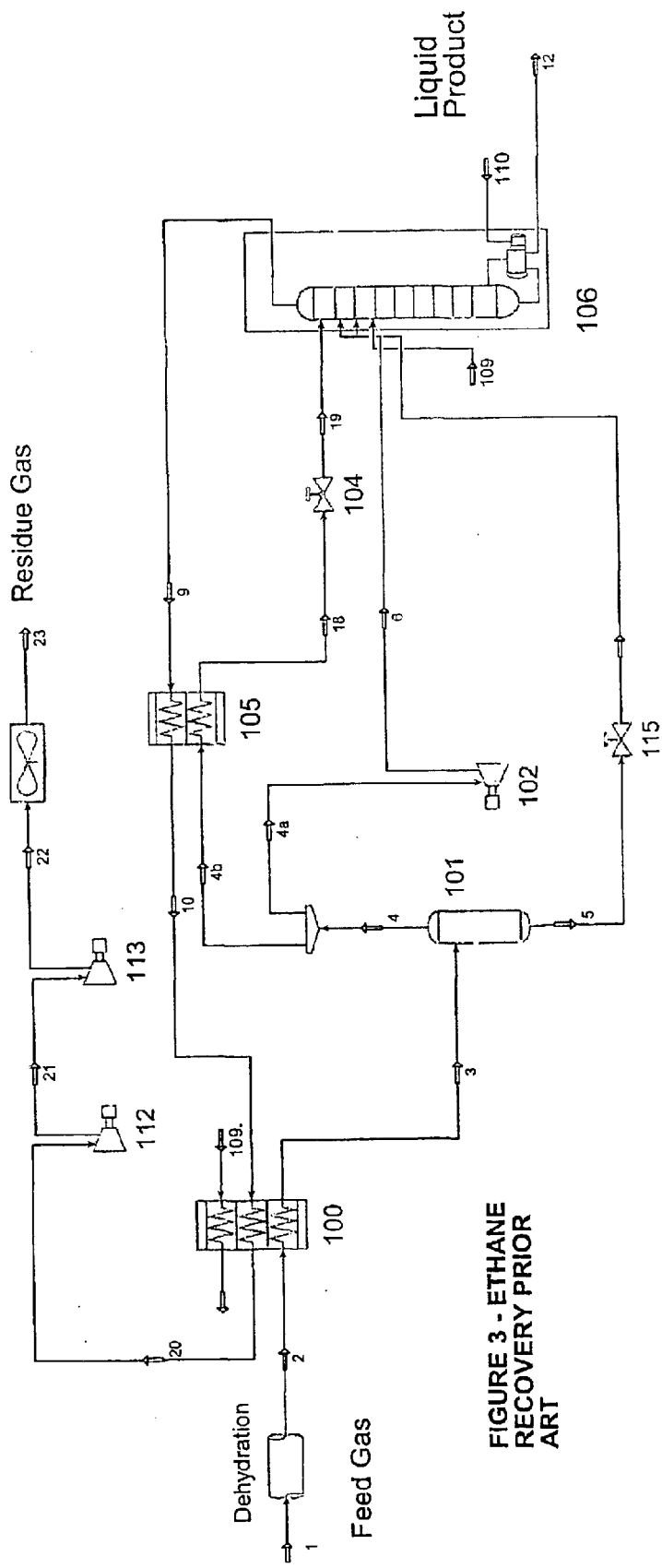

TABLE 3 - STREAM SUMMARY FOR FIGURE 3 ETHANE RECOVERY - PRIOR ART

| Stream Number | 1 | 2 | 3 | 4 | 4a | 4b | 5 | 6 |
|---|---|---|---|---|---|---|---|---|
| Temp., °F | 68 | 67 | 35 | 35 | 35 | 35 | 35 | -62 |
| Pressure, psig | 1300 | 1275 | 1268 | 1268 | 1268 | 1268 | 1268 | 429 |
| Flow, lbmol/hr | 109,805 | 109,805 | 109,805 | 109,805 | 64,236 | 45,569 | - | 64,236 |

| Stream Number | 9 | 10 | 12 | 16 | 18 | 19 | 20 | 21 |
|---|---|---|---|---|---|---|---|---|
| Temp., °F | -125 | 18 | 97 | 55 | -121 | -132 | 31 | 76 |
| Pressure, psig | 425 | 420 | 428 | 427 | 1263 | 429 | 415 | 558 |
| Flow, lbmol/hr | 100,496 | 100,496 | 9,309 | 22,201 | 45,569 | 45,569 | 100,496 | 100,496 |

| Stream Number | 22 | 23 | 109 |
|---|---|---|---|
| Temp., °F | 220 | 110 | 32 |
| Pressure, psig | 1315 | 1300 | 427 |
| Flow, lbmol/hr | 100,496 | 100,496 | 22,201 |

Key Stream Component Flow (lbmol/hr)

| Stream Number | 1 | 9 | 12 | 23 |
|---|---|---|---|---|
| CO2 | 1,647 | 1,542 | 105 | 1,542 |
| N2 | 471 | 471 | 0 | 471 |
| C1 | 97,044 | 97,043 | 1 | 97,043 |
| C2 | 6,582 | 1,347 | 5,236 | 1,347 |
| C3 | 2,988 | 87 | 2,901 | 87 |
| IC4 | 327 | 3 | 324 | 3 |
| NC4 | 488 | 3 | 485 | 3 |
| IC5 | 125 | 0 | 124 | 0 |
| NC5 | 124 | 0 | 124 | 0 |
| NC6 | 9 | 0 | 9 | 0 |

| Recoveries: | | |
|---|---|---|
| Ethane | 79.5% | |
| Propane | 97.1% | |
| Butanes+ | 99.4% | |
| Residue Gas Compressor | 46,230 HP | 46.23 HP/MMscfd |
| CO2 in C2 | 2.0% | |

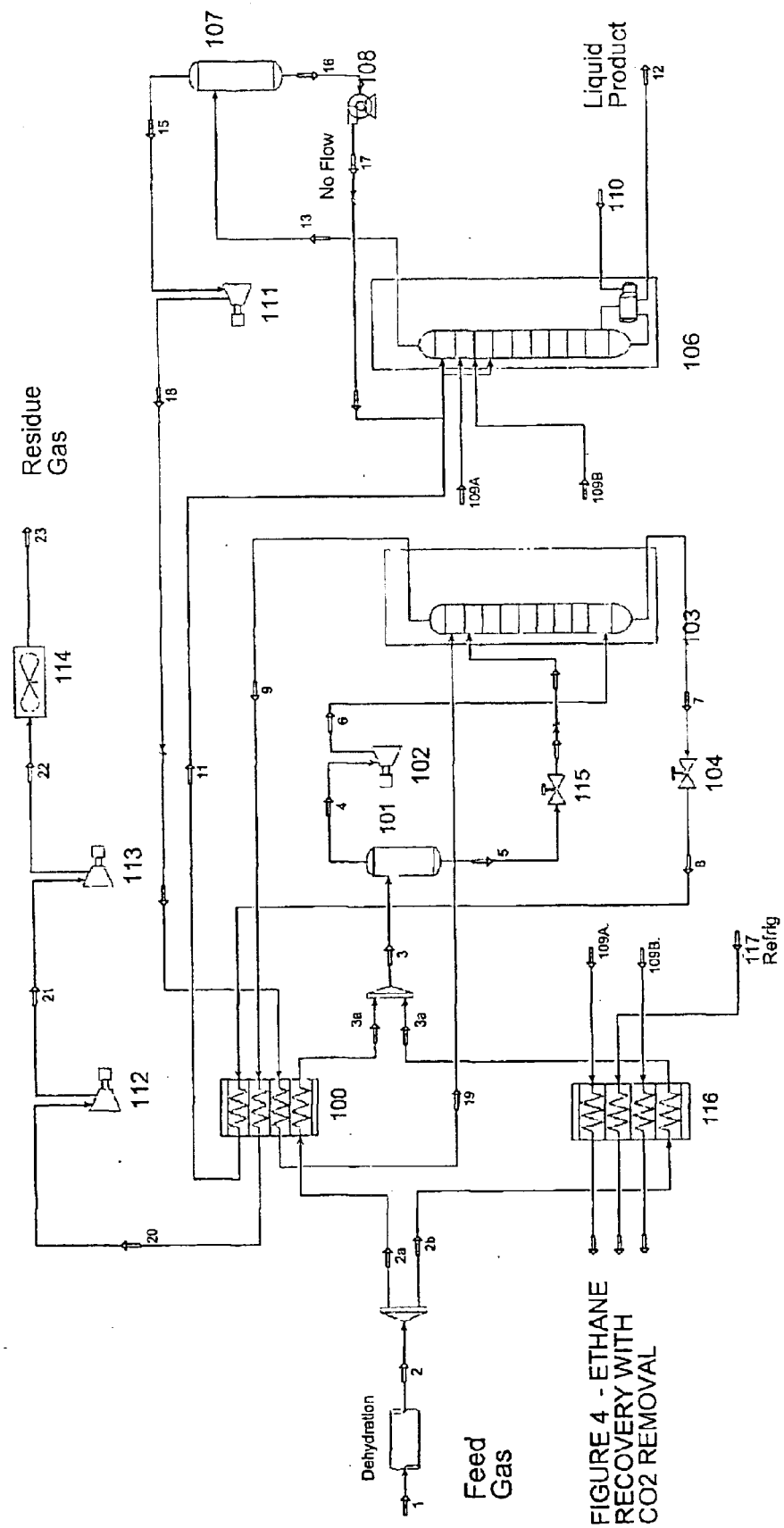

TABLE 4 - STREAM SUMMARY FOR FIGURE 4 ETHANE RECOVERY

| Stream Number | 1 | 2 | 3 | 4 | 5 | 6 | 7 | 8 |
|---|---|---|---|---|---|---|---|---|
| Temp., °F | 68 | 67 | -50 | -50 | -50 | -101 | -104 | -116 |
| Pressure, psig | 1300 | 1275 | 1268 | 1268 | 1268 | 589 | 587 | 475 |
| Flow, lbmol/hr | 109,805 | 109,805 | 109,805 | 109,805 | - | 109,805 | 66,995 | 66,995 |

| Stream Number | 9 | | | | | | | |
|---|---|---|---|---|---|---|---|---|
| Temp., °F | -111 | -108 | 12 | 13 | 15 | 16 | 17 | 18 |
| | | | 110 | -90 | -90 | -90 | -81 | -56 |
| Pressure, psig | 585 | 472 | 450 | 448 | 448 | 448 | 485 | 595 |
| Flow, lbmol/hr | 101,195 | 66,995 | 8,580 | 58,416 | 58,416 | - | - | 58,416 |

| Stream Number | 19 | 20 | 21 | 22 | 23 | 109A | 109B | 117 |
|---|---|---|---|---|---|---|---|---|
| Temp., °F | -111 | 62 | 87 | 198 | 110 | -27 | -89 | 6 |
| Pressure, psig | 588 | 575 | 675 | 1315 | 1300 | 449 | 458 | 28 |
| Flow, lbmol/hr | 58,386 | 101,195 | 101,195 | 101,195 | 101,195 | 21,550 | 33,597 | 4,105 |

Key Stream Component Flow (lbmol/hr)

| Stream Number | 1 | 2 | 3 | 11 | 12 | 13 | 17 | 23 |
|---|---|---|---|---|---|---|---|---|
| CO2 | 1,647 | 1,723 | 1,644 | 1,723 | 2 | 1,720 | - | 1,644 |
| N2 | 471 | 117 | 471 | 117 | 0 | 117 | - | 471 |
| C1 | 97,044 | 53,038 | 97,016 | 53,038 | 0 | 53,038 | - | 97,016 |
| C2 | 6,582 | 7,870 | 2,013 | 7,870 | 4,568 | 3,302 | - | 2,013 |
| C3 | 2,988 | 3,162 | 50 | 3,162 | 2,938 | 224 | - | 50 |
| IC4 | 327 | 334 | 1 | 334 | 326 | 7 | - | 1 |
| NC4 | 488 | 494 | 1 | 494 | 487 | 7 | - | 1 |
| IC5 | 125 | 125 | 0 | 125 | 125 | 1 | - | 0 |
| NC5 | 124 | 124 | 0 | 124 | 124 | 0 | - | 0 |
| NC6 | 9 | 9 | 0 | 9 | 9 | 0 | - | 0 |

Recoveries:
Ethane         69.4%
Propane        98.3%
Butanes+       99.9%

Residue Gas Compressor    35,592 HP
DeC2 Ovhd Compressor       4,489
Refrigeration              4,728
Total HP                  44,809          44.81 HP/MMscfd
CO2 in Ethane                500 ppm

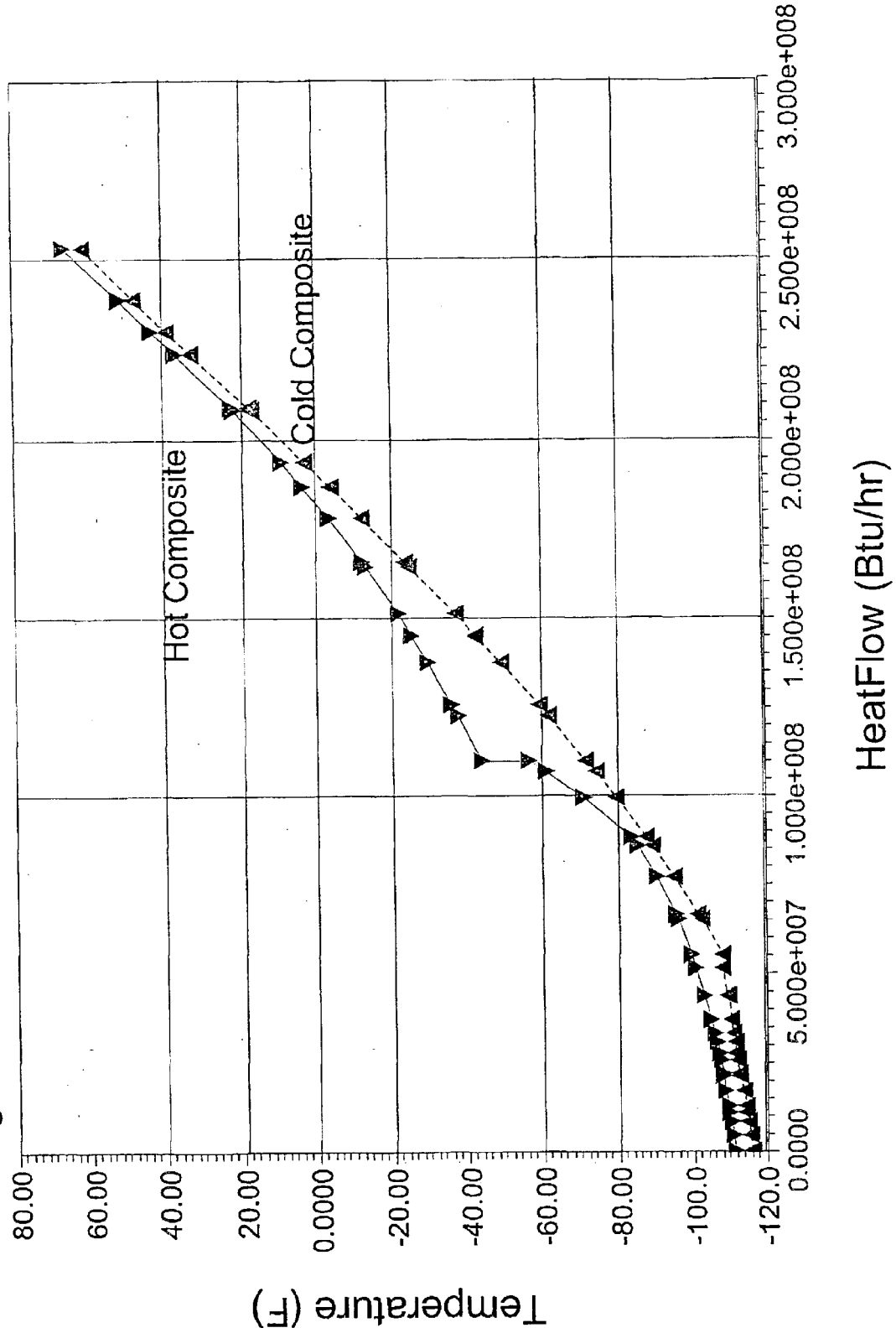

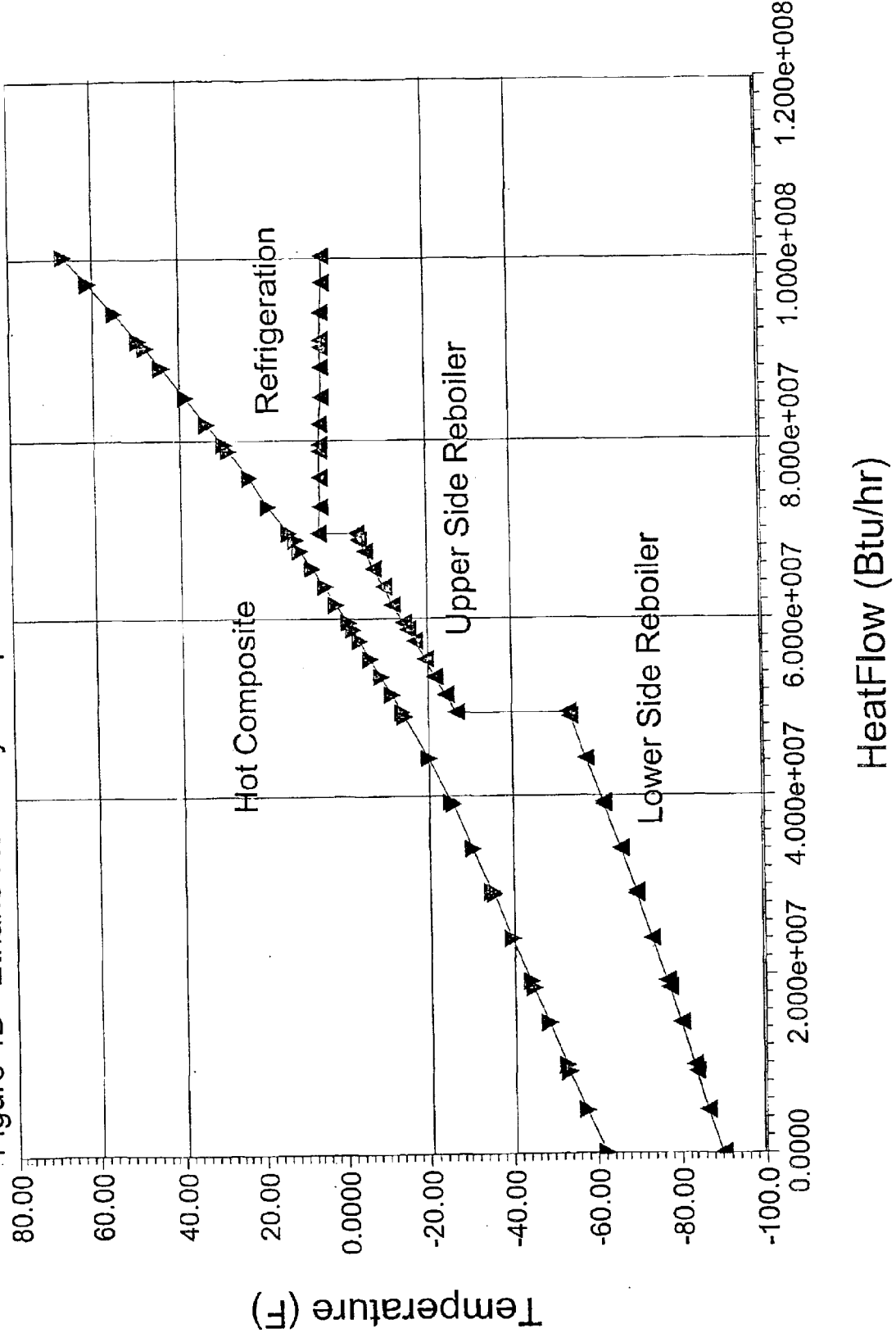

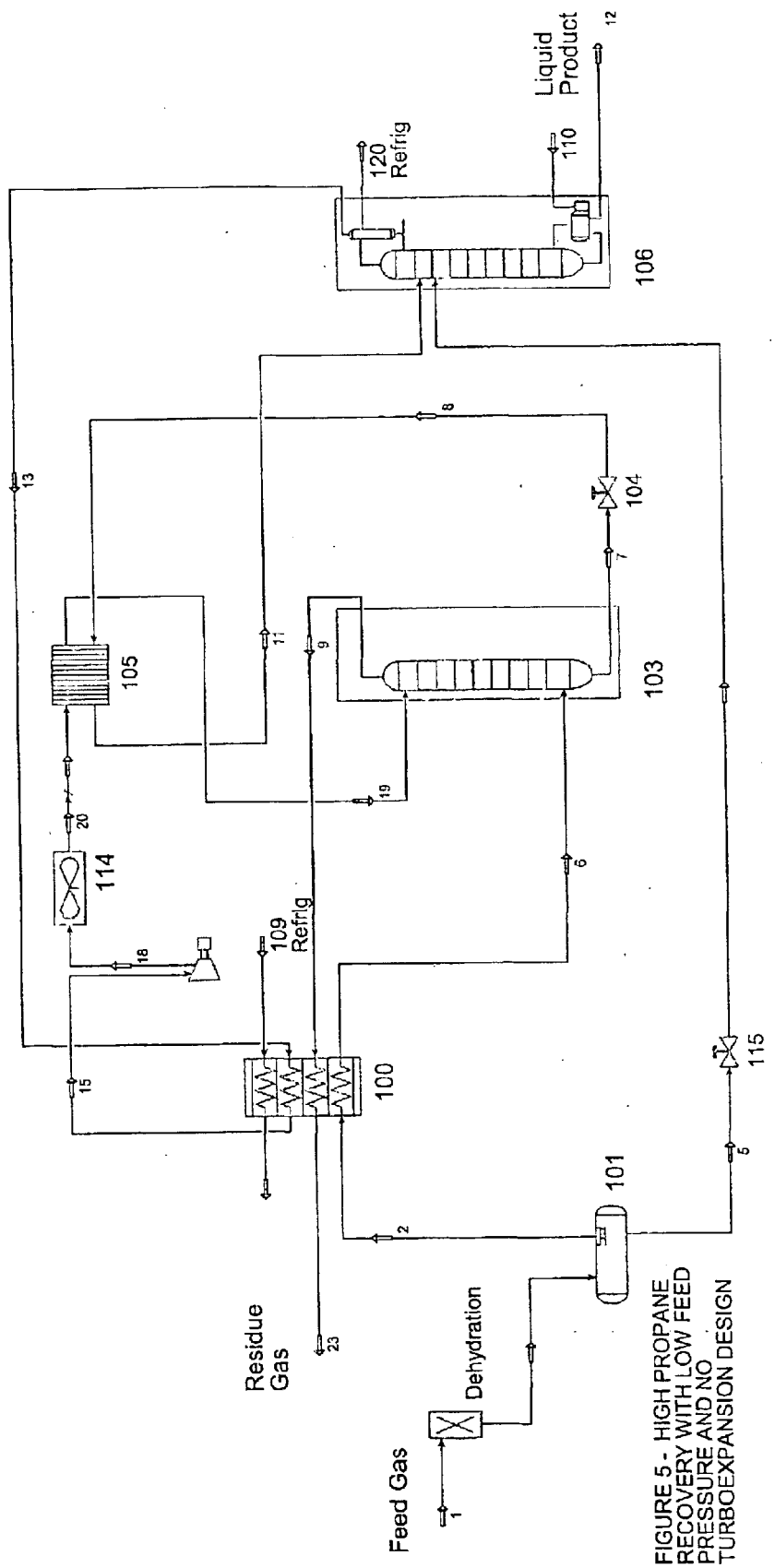
FIGURE 5 - HIGH PROPANE RECOVERY WITH LOW FEED PRESSURE AND NO TURBOEXPANSION DESIGN

Table 5 - STREAM SUMMARY FOR FIGURE 5

HIGH PROPANE RECOVERY WITH LOW FEED PRESSURE AND NO TURBOEXPANSION

| Stream Number | 1 | 2 | 5 | 6 | 7 | 8 | 9 | 11 |
|---|---|---|---|---|---|---|---|---|
| Temp., °F | 125 | 125 | 125 | -45 | -47 | -61 | -58 | 10 |
| Pressure, psig | 765 | 750 | 750 | 743 | 725 | 515 | 720 | 510 |
| Flow, lbmol/hr | 109,805 | 107,684 | 1,517 | 107,684 | 53,394 | 53,394 | 91,164 | 53,394 |

| Stream Number | | 12 | 13 | 15 | 18 | 19 | 20 | 23 | |
|---|---|---|---|---|---|---|---|---|---|
| Temp., °F | | 239 | -30 | 95 | 168 | -50 | 100 | 100 | |
| Pressure, psig | | 506 | 500 | 493 | 780 | 770 | 775 | 713 | |
| Flow, lbmol/hr | | 17,686 | 37,224 | 37,224 | 37,224 | 36,874 | 37,224 | 91,164 | |

Key Stream Component Flow (lbmol/hr)

| Stream Number | 1 | 2 | 5 | 7 | 8 | 9 | 11 |
|---|---|---|---|---|---|---|---|
| CO2 | 1,647 | 1,648 | 1,649 | 1,650 | 1,651 | 1,652 | 1,653 | 1,654 |
| N2 | 3,814 | 3,808 | 6 | 520 | 3,809 | 0 | 526 | 3,809 |
| C1 | 70,549 | 70,297 | 252 | 23,535 | 70,338 | 0 | 23,787 | 70,338 |
| C2 | 10,767 | 10,645 | 121 | 8,598 | 10,529 | 144 | 8,575 | 10,529 |
| C3 | 10,284 | 10,017 | 267 | 10,233 | 282 | 10,000 | 500 | 282 |
| IC4 | 2,002 | 1,908 | 94 | 1,908 | 0 | 2,002 | 0 | 0 |
| NC4 | 2,813 | 2,648 | 164 | 2,648 | 0 | 2,813 | 0 | 0 |
| IC5 | 829 | 744 | 85 | 744 | 0 | 829 | 0 | 0 |
| NC5 | 656 | 576 | 79 | 576 | 0 | 656 | 0 | 0 |
| NC6+ | 1,242 | 834 | 408 | 834 | 0 | 1,242 | 0 | 0 |

Recoveries:
Propane 97.2%
Butanes+ 100.0%

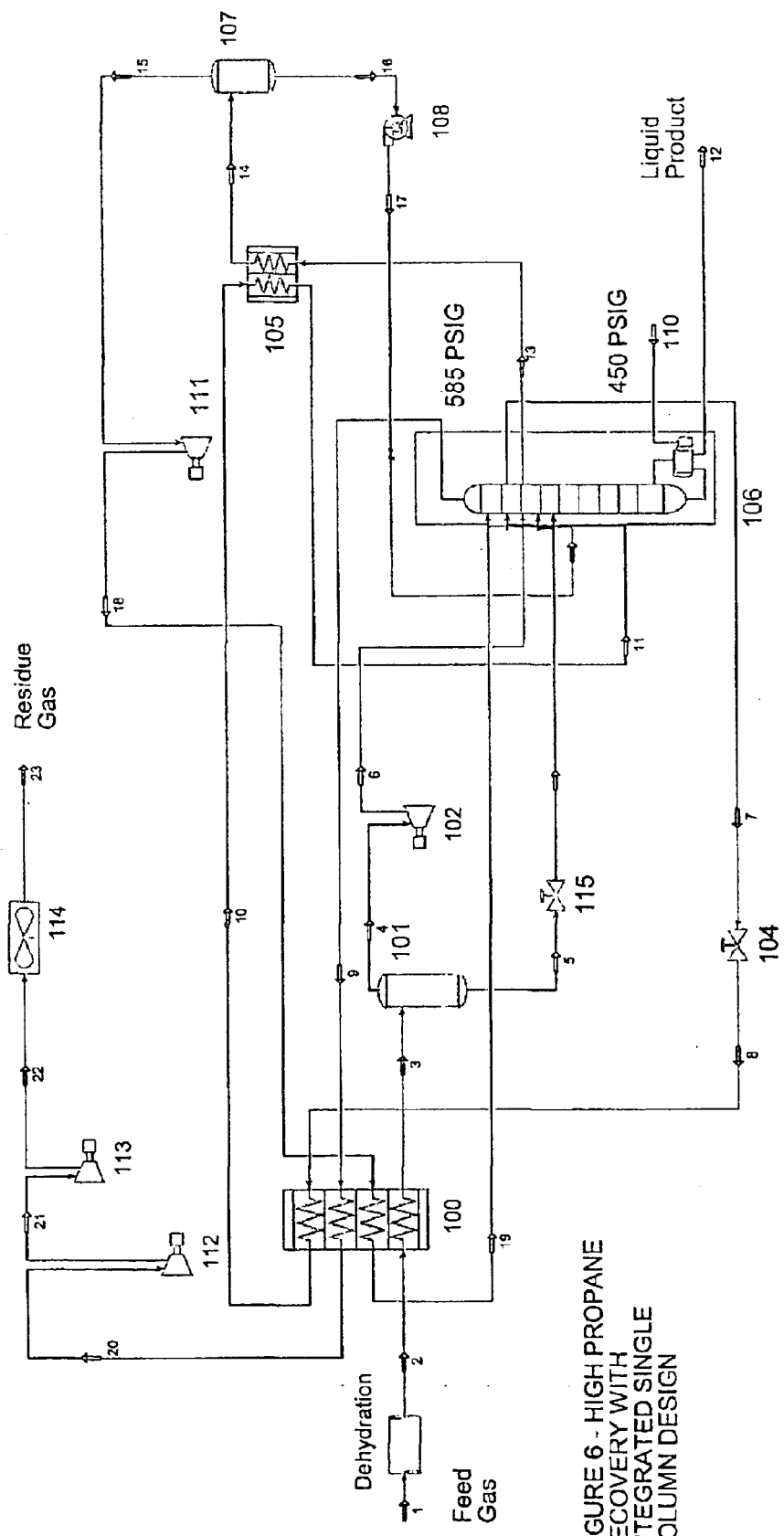
FIGURE 6 - HIGH PROPANE RECOVERY WITH INTEGRATED SINGLE COLUMN DESIGN

HIGH PROPANE RECOVERY PROCESS AND CONFIGURATIONS

This application claims the benefit of Provisional Application No. 60/224,958 filed Aug. 11, 2000.

FIELD OF THE INVENTION

The field of the invention is recovery of a gas fraction from a feed gas, and particularly relates to propane recovery.

BACKGROUND OF THE INVENTION

Many natural and man-made gases comprise a variety of different hydrocarbons, and numerous methods and configurations are known in the art to produce commercially relevant fractions from such gases. Among other processes, cryogenic gas separation (see e.g., U.S. Pat. No. 4,157,904 to Campbell et al., U.S. Pat. No. 4,690,702 to Paradowski et al., or U.S. Pat. No. 5,275,005 to Campbell et al.) has become a preferred method of gas separation.

In a typical gas separation process, a feed gas stream under pressure is cooled by heat exchanger and as the gas cools, liquids condense from the cooled gas. The liquids are then expanded and fractionated in a distillation column (e.g., de-ethanizer or de-methanizer) to separate residual components such as methane, nitrogen and other volatile gases as overhead vapor from the desired $C_2$, $C_3$ and heavier components. In some configurations, uncondensed cooled feed gas is expanded to condense additional liquid, which may subsequently be employed as $C_2$ and $C_3$ absorbing agent in an absorber. Various improvements on the basic concept of cryogenic gas separation have been developed.

For example, Rambo et al. describe in U.S. Pat. No. 5,890,378 a system in which (a) the absorber is refluxed, (b) in which the de-ethanizer condenser provides the reflux for both the absorber and the de-ethanizer while the cooling requirements are met using a turboexpander, and (c) in which the absorber and the de-ethanizer operate at substantially the same pressure. Although Rambo's configuration advantageously reduces capital cost for equipment associated with providing reflux for the absorption section and the de-ethanizer, propane recovery significantly decreases as the operating pressure in the absorber rises, especially at a pressure above 500 psig, where separation of ethane from propane in the de-ethanizer becomes increasingly difficult. Consequently, Rambo's system is generally limited by the upper operating limit of the de-ethanizer pressure. Increasing of the absorber pressure while maintaining desirable propane recovery becomes difficult, if not impossible in Rambo's process configuration. Moreover, operating the absorber and de-ethanizer at a pressure at or below 500 psig typically necessitates higher residue gas recompression, thereby incurring relatively high operating cost.

To circumvent at least some of the problems associated with relatively high cost associated with residue gas recompression, Sorensen describes in U.S. Pat. No. 5,953,935 a plant configuration in which an additional fractionation column is included. The absorber reflux in Sorensen's plant configuration is produced by compressing, cooling, and Joule Thomson expansion of a slipstream of feed gas. Although Sorensen's configuration generally provides an improved propane recovery with substantially no increase in plant residue compression horsepower, propane recovery significantly decreases as the operating pressure in the absorber rises, especially at a pressure above about 500 psig. Furthermore, ethane recovery using such known systems designed for propane recovery is normally limited to about 20% recovery.

In order to improve ethane recovery with a low $CO_2$ content in the ethane product, Campbell describes in U.S. Pat. No. 6,182,469 a tower reboiling scheme in which one or more tower liquid distillation streams from a point higher in the absorber are employed for stripping of undesirable components (e.g., carbon dioxide in a demethanizer). Campbell's scheme typically requires over-stripping of the ethane product, and $CO_2$ removal is generally limited to about 6%. Moreover, additional $CO_2$ removal using Campbell's process will significantly reduce ethane recovery, and increase power consumption. Furthermore, and especially where the ethane product is used for chemical production, the product in Campbell's configuration typically requires further treatment to remove $CO_2$ to or below a level of 500 ppmv, which often requires substantial capital and operating expenditure.

Although there are various configurations and processes for improved propane and ethane recovery known in the art, all or almost all of them, suffer from one or more disadvantage. Therefore, there is still a need to provide improved methods and compositions for high propane recovery processes and configurations.

SUMMARY OF THE INVENTION

The present invention is directed to methods and configurations of a gas plant comprising a refluxed absorber producing a bottoms product stream and receiving a feedstock and an absorber reflux stream. A distillation column is fluidly coupled to the absorber, receives a distillation column feed stream and operates at a pressure that is at least 100 psi lower than the operating pressure of the absorber.

In one aspect of the inventive subject matter, the distillation column comprises a de-ethanizer column, the feedstock has a pressure of between 1000 psig and 2000 psig, and is expanded in a turbine expander. The bottoms product of the absorber is expanded in a range of 100–250 psi, thereby cooling the product to a temperature between −95° F. to −125° F. It is also contemplated that the cooled and expanded bottoms product stream is then fed as the distillation column feed stream into the distillation column, and it is still further contemplated that the expanded bottoms product stream may further provide cooling for a distillation column reflux stream. In a particularly contemplated aspect the distillation column produces an overhead stream that is compressed, cooled, and fed into the absorber as the absorber reflux stream.

In another aspect of the inventive subject matter, the distillation column comprises a de-ethanizer column, the feedstock has a pressure of between 550 psig and 800 psig, and is not expanded in a turbine expander. The bottoms product of the absorber is expanded in a range of 100–250 psi, thereby cooling the product to a temperature between −50° F. to −70° F. It is also contemplated that the cooled and expanded bottoms product stream is then fed as the distillation column feed stream into the distillation column, and that at least a portion of the feedstock is fed into a lower section of the distillation column. In a further contemplated aspect, an external refrigeration is coupled to the distillation column and feed exchanger.

In a still further aspect of the inventive subject matter, the distillation column comprises a demethanizer, the feedstock is at a pressure of between 1000 psig and 2000 psig, and is expanded in a turboexpander. It is also contemplated that in such configurations the absorber bottoms product is expanded in a range of 100–250 psi, thereby cooling the bottoms product stream to a temperature of between −95° F. to −125° F. It is further contemplated that the expanded bottoms product is fed as the distillation column feed stream into the distillation column, wherein the distillation column produces a distillation column overhead stream that is compressed, cooled, and fed into the absorber as the absorber reflux stream, and that the distillation column produces a distillation column product stream that comprises no more than 500 ppm carbon dioxide. In particularly contemplated aspects, the feedstock is split into a first portion and a second portion, and wherein an external refrigeration cools at least part of the first portion, and wherein at least one side reboiler located in the upper section of the distillation column (i.e. is fluidly coupled to the demethanizer between a top tray and a position eight trays below the top tray), provides reboiling of the distillation column, provides heat duty for stripping of $CO_2$ from the demethanizer product stream, and further provides cooling of the first portion of the feedstock.

Various objects, features, aspects and advantages of the present invention will become more apparent from the following detailed description of preferred embodiments of the invention, along with the accompanying drawings.

BRIEF DESCRIPTION OF THE DRAWING

FIG. 1 is a prior art schematic of an exemplary gas processing plant for propane recovery.

FIG. 2 is a schematic of an exemplary configuration for gas processing plant for propane recovery with a turboexpander, a feed gas pressure of about 1300 psig, and a de-ethanizer as distillation column.

FIG. 2A is a graph depicting a heat composite curve for heat exchanger 100 in a plant configuration according to FIG. 2.

FIG. 3 is a prior art schematic of another exemplary gas processing plant for ethane recovery.

FIG. 4 is a schematic of a further exemplary configuration for a gas processing plant for ethane recovery with a turboexpander, a feed gas pressure of about 1300 psig, and a demethanizer as distillation column.

FIG. 4A is a graph depicting a heat composite curve for heat exchanger 100 in a plant configuration according to FIG. 4.

FIG. 4B is a graph depicting a heat composite curve for a side heat exchanger 116 in a plant configuration according to FIG. 4.

FIG. 5 is a schematic of yet another exemplary configuration for a gas processing plant without turboexpander, a feed gas pressure of about 750 psig, and a de-ethanizer as distillation column.

FIG. 6 is a schematic of an exemplary configuration for a gas processing plant in which the refluxed absorber and the distillation column are configured in a single tower.

DETAILED DESCRIPTION

The inventors discovered that high propane recovery (i.e., at least 95%) from a feed gas with relatively high (e.g., between about 1000 psig to 2000 psig) to relatively low (e.g., between about 550 psig to 800 psig) pressure can be realized by operating an absorber in a gas processing plant at a significantly higher pressure than a distillation column (e.g., a de-ethanizer), and in which the absorber bottoms product is expanded to provide cooling for the absorber reflux stream and/or the distillation column feed. The inventors have further discovered that such configurations may also be employed to significantly increase ethane recovery from feed gas with relatively high pressure, and to significantly remove $CO_2$.

More particularly, the inventors contemplate a gas processing plant that comprises a refluxed absorber operating at a first pressure, that produces a bottoms product stream and that receives a feedstock and an absorber reflux stream. Contemplated configurations further include a distillation column that is fluidly coupled to the absorber that receives a distillation column feed stream and that is operated at a second pressure, which is at least 100 psi lower than the operating pressure of the absorber, wherein at least a portion of the bottoms product stream is expanded and provides cooling for the absorber reflux stream and/or the distillation column feed stream.

Prior art FIG. 1 depicts a known configuration for a propane recovery plant in which a feed gas stream 1 at a pressure of about 1300 psig is cooled in a heat exchanger 100, separated into a gaseous and a liquid phase, and the gaseous phase is then expanded in a turboexpander 102 and fed into the absorber 103, which operates at a pressure of about 450 psig. The liquid phase (if present) is Joule-Thomson (JT) expanded, and directly fed into a lower portion of the absorber. The bottoms product of the absorber is pumped via pump 104 through heat exchanger 100, and the heated bottoms product is subsequently fed into the de-ethanizer.

The absorber 103 is refluxed using cooled de-ethanizer overhead stream 14, wherein the cooling of the reflux is provided by the overhead vapor from the absorber, which is further heated in heat exchanger 100 prior to recompression in recompressor 112 and subsequent residue gas compressor 113. Absorber 103 further provides reflux stream 17 that is fed into the de-ethanizer via pump 108. Liquid product stream 12 leaves the de-ethanizer with a propane recovery typically above 95%.

In contrast, a particularly preferred configuration of a gas processing plant for propane recovery as depicted in FIG. 2 has a refluxed absorber 103 that is operated at a pressure of about 590 psig and a de-ethanizer 106 that is operated at a pressure of about 410 psig, while the feed gas stream 1 has a pressure of about 1300 psig. The feed gas stream 1 is cooled in heat exchanger 100 and separated in a separator 101 in a liquid portion 5 and a gaseous portion 4. The liquid portion 5 (if present) is fed into the absorber 103, while the gaseous portion 4 is expanded in a turboexpander 102 to the level of the operating pressure of the absorber. Expanded gaseous portion 6 is then fed into a lower section of the absorber 103. The absorber 103 receives a reflux stream 19, which is provided by the overhead stream 13 of the de-ethanizer 106. The overhead stream 13 is cooled in a heat exchanger 105, and separated in a separator 107 in a gaseous phase 15 and a liquid phase 16. Liquid phase 16 is pumped back to the de-ethanizer as de-ethanizer reflux via pump 108, while gaseous phase 15 is compressed in compressor 111 and cooled in the heat exchanger 100 before entering the absorber as reflux stream 19.

The absorber bottoms stream 7 is expanded in JT valve 104, thereby lowering the pressure in an amount of about 180 psi and significantly cooling the absorber bottoms stream. The cooled absorber bottoms stream 8 is then employed as a coolant in the heat exchangers 100 and 105 before entering de-ethanizer 106 as de-ethanizer feed stream 11. Absorber overhead stream 9 is heated in the heat exchanger 100 and recompressed in recompressor 112 (which is operationally coupled to the turboexpander). Recompressed overhead stream 21 is farther compressed in residue gas compressor 113 and fed into a residue gas pipeline. The de-ethanizer bottoms stream 12 provides liquid product at a propane recovery of at least 99%.

With respect to the feed gas streams it is contemplated that numerous natural and manmade feed gas streams are suitable for use in conjunction with the teachings presented herein, and especially preferred feed gas streams include natural gases, refinery gases, and synthetic gas streams from hydrocarbon materials such as naphtha, coal, oil, lignite, etc. Consequently, the pressure of contemplated feed gas streams may vary considerably. However, it is generally preferred that appropriate feed gas pressures for plant configurations according to FIG. 2 will generally be in the range between 1000 psig and 2000 psig, and that at least a portion of the feedstock is expanded in a turboexpander to provide cooling and/or power for the residue gas recompression.

Depending on the pressure of the feed gas and the amount of feed gas expansion in the turboexpander, the operating pressure for the absorber may vary in the range from between 500 psig to 800 psig, more preferably between 500 psig and 750 psig and most preferably between 550 psig and 700 psig. Thus, it should be especially appreciated that the bottoms product stream has leave the absorber at a considerable pressure, and that cooling can be provided from expanding the bottoms product stream to a lower pressure. In a particularly contemplated aspect, expansion of the bottoms product stream reduces the bottoms product stream pressure in a range of about 100 psi to about 250 psi, and more preferably in a range of about 150 psi to 200 psi. Thus, it is contemplated that the absorber is operated at a pressure that is at least 100 psi higher than the pressure of the distillation column, however, alternative pressure differences are also contemplated and include absorber pressure differences of less than 100 psi (e.g., between 50 psi and 99 psi, and even less), and particularly include absorber pressure differences of more than 100 psi (e.g., between 101 psi and 150 psi, more preferably between 151 psi and 250 psi, and even higher).

Consequently, it should be appreciated that the temperature of the expanded bottoms product stream will be in a range of about −95° F. to −125° F. Therefore, it is contemplated that the expanded bottoms product stream may further provide cooling for various streams within the gas processing plant, and it is especially contemplated that the expanded bottoms product stream further cools a distillation column overhead stream, and absorber reflux. It is still further contemplated that the expanded bottoms product stream may be fed into the distillation column at various positions, however, it is particularly preferred that the expanded bottoms product stream is fed into the distillation column at a position below the feed point of the reflux (e.g., at least three trays below the upmost tray in the distillation column)

With respect to the distillation column it should be especially appreciated that the distillation column produces a distillation column overhead stream that is compressed, cooled, and fed into the absorber as the absorber reflux stream, thereby providing a particularly lean stream (stream 13 containing 64 mol % methane and 33 mol % ethane) that maybe employed to recover the propane and heavier components from the expanded feed gas streams. Thus contemplated configurations according to FIG. 2 receive a feedstock that comprises propane, and provide a distillation column product stream that comprises at least 95% of the propane in the feedstock.

In another particularly preferred aspect of the inventive subject matter, a gas processing plant as depicted in FIG. 5 has a refluxed absorber 103 that is operated at a pressure of about 720 psig and a de-ethanizer 106 that is operated at a pressure of about 500 psig, while the feed gas stream 1 has a pressure of about 760 psig. The feed gas stream 1 is separated in separator 101 in a liquid portion 5 and a gaseous portion 2. The liquid portion is JT expanded in JT valve 115 and directly fed into the de-ethanizer column 106. The gaseous portion 2 is cooled in a heat exchanger 100 and the cooled gaseous portion 6 is then fed into absorber 103 without expansion in a turboexpander. The absorber 103 receives a reflux stream 19, which is provided by the overhead stream 13 from the reflux drum 102 of the de-ethanizer 106. The de-ethanizer overhead stream 13, coupled with an external refrigeration stream 109, and absorber overhead vapor stream 9 are used to cool the feed stream 2 in exchanger 100. The de-ethanizer overhead stream 13 is heated to ambient temperature in exchanger 100 by the feed stream in exchanger 100, and is then compressed in a compressor to stream 18. The compressor discharge stream 18 is cooled in an air cooled exchanger 114 and then further chilled in heat exchanger 105 with absorber bottoms stream 8 before entering the absorber as reflux stream 19.

The absorber bottoms stream 7 is expanded in JT valve 104, thereby lowering the pressure in an amount of about 210 psi and significantly cooling the absorber bottoms stream from −47° F. to −61° F. The expanded and cooled absorber bottoms stream 8 is then employed as a coolant in the heat exchanger 105 before entering de-ethanizer 106 as de-ethanizer feed stream 11. Absorber overhead stream 9 is heated in the heat exchanger 100 and fed into the residue gas pipeline without recompression. The de-ethanizer bottoms stream 12 provides liquid product at a propane recovery of at least 95%.

With respect to the type and chemical composition of the feed gas the same consideration as described above apply. However, in plant configurations according to FIG. 5, the feed gas has a pressure of between about 550 psig and about 800 psig, and most preferably between about 600 psig and about 750 psig. It should be particularly appreciated that operation of the absorber at a higher pressure allows that the feed gas is fed into the absorber without passing through a turboexpander. Consequently, the pressure in the absorber bottoms product (which is preferably rich in methane) may advantageously be employed for refrigeration of various streams in the plant.

Thus, it is contemplated that the absorber bottoms product stream is expanded to reduce the bottoms product stream pressure in a range of about 50 psi to about 350 psi, and more preferably in a range of about 10 psi to about 250 psi. Consequently, it is contemplated that the bottoms product stream will have a temperature between −30° F. to −80° F., and more typically between about between −50° F. to −70° F. While not limiting to the inventive subject matter, it is generally contemplated that the expanded bottoms product stream is fed as the distillation column feed stream into the distillation column below the top of the distillation column, and it is preferred that the expanded bottoms product stream is fed into the distillation column at a position that is at least three trays below an upmost tray in the distillation column. With respect to the liquid portion of the feed gas, it is generally preferred that at least a portion of the feed gas is fed into a lower section of the distillation column.

It should further be appreciated that during propane recovery, the absorber bottoms after it is used to chill the absorber overhead reflux, is farther utilized (if residual refrigeration is available) to cool the de-ethanizer overhead vapor providing reflux to the de-ethanizer. The heated absorber bottoms product stream at about −30° F. to about −50° F. is fed to a feed tray located at least 3 trays from the utmost top of the de-ethanizer. This arrangement improves the overall fractionation performance of the de-ethanizer by providing reflux and additional rectification utilizing the refrigeration content by the JT of the absorber bottoms. The de-ethanizer operates at an overhead temperature between −20 to −55° F.

With respect to the de-ethanizer it should be especially appreciated that the de-ethanizer produces an overhead stream that is cooled, and fed into the absorber as the absorber reflux stream, thereby providing a particularly lean stream (stream 13 containing 75 mol % methane and 25 mol % ethane) that may be employed to recover the propane and heavier components from the feed gas stream. Thus, contemplated configurations according to FIG. 5 receive a feedstock that comprises propane, and provide a distillation column product stream that comprises at least 95% of the propane in the feedstock.

In a still further contemplated aspect of the inventive subject matter, contemplated configurations may further be employed in a gas processing plant for ethane recovery from a feed gas. FIG. 3 depicts a prior art configuration in which a feed gas stream 1 at a pressure of about 1300 psig is cooled and separated into a gaseous portion 4 and liquid portion 5. The gaseous portion is split in two streams, and the first stream cooled and JT expanded, while the second stream is passed through a turboexpander. Both streams are then fed into different locations in the demethanizer. The demethanizer operates at about 430 psig. The demethanizer overhead provides cooling for the first stream and is recompressed by the turboexpander and further compressed by the residue gas compressor before leaving the plant as residue gas. Typical ethane recovery is about 80%, and the $CO_2$ content in the ethane product is about 2 to 6%.

In contrast, an ethane recovery plant configurations according to the inventive subject matter as shown in FIG. 4 has a refluxed absorber 163 that is operated at a pressure of about 590 psig and a de-ethanizer 106 that is operated at a pressure of about 450 psig, while the feed gas stream 1 has a pressure of about 1300 psig. The feed gas stream 1 is split into a first portion 2a and a second portion 2b. The first portion 2a is cooled in heat exchanger 100 and the second portion 2b is cooled in heat exchanger 116. The respective cooled fed gas streams 3a and 3b are combined and separated in a separator 101 in a liquid portion 5 and a gaseous portion 4. The liquid portion 5 (if present) is fed into the absorber 103 after JT expansion in JT valve 115, while the gaseous portion 4 is expanded in a turboexpander 102 to the level of the operating pressure of the absorber 103. Expanded gaseous portion 6 is then fed into a lower portion of the absorber 103. The absorber 103 receives a reflux stream 19, which is provided by the demethanizer overhead stream 13 of the demethanizer 106. The overhead stream 13 is separated in a separator 107 in a gaseous phase 15 and a liquid phase 16. Liquid phase 16 is pumped back to the demethanizer as demethanizer reflux via pump 108, while gaseous phase 15 is compressed in compressor 111 and cooled in the heat exchanger 100 before entering the absorber as reflux stream 19.

The absorber bottoms stream 7 is expanded in JT valve 104, thereby lowering the pressure in an amount of about 110 psi and significantly cooling the absorber bottoms stream. The cooled absorber bottoms stream 8 is then employed as a coolant in the heat exchanger 100 before entering demethanizer 106 as demethanizer feed stream 11. Absorber overhead stream 9 is heated in the heat exchanger 100 and recompressed in recompressor 112 (which is operationally coupled to the turboexpander). Recompressed overhead stream 21 is further compressed in a residue gas compressor 113 and fed into a residue gas pipeline. The demethanizer bottoms stream 12 provides liquid product at an ethane recovery of at least 69.0% and a CO2 content of no more than 500 ppm. Two side reboilers, located in the top section of the demethanizer, withdraw distillation liquids stream 109A and 109B. These streams are coupled to the distillation column and provide heat duties for the bulk removal of $CO_2$ from the liquid product, and further provide cooling of the first portion of the feedstock by stream 109A and 109B. The residual $CO_2$ is removed in the bottom reboiler 110.

Suitable feed gases are contemplated to have a pressure of between 100 psig and 2000 psig. Consequently, it is preferred that at least a portion of the feed gas is expanded in a turboexpander. Further cooling is provided by expanding the bottoms product stream in a range of 100–250 psi. Consequently, it is contemplated that the expanded bottoms product stream has a temperature between −95° F. to −125° F.

With respect to the de-methanizer it should be especially appreciated that the demethanizer column produces an overhead stream that is compressed, cooled, and fed into the absorber as the absorber reflux stream, thereby providing a particularly lean stream (stream 13 containing over 90 mol % methane) that may be employed to recover the ethane and heavier components from the expanded feed gas streams. Thus contemplated configurations according to FIG. 4 receive a feedstock that comprises ethane and propane, and provide a distillation column product stream that comprises at least 60% of the ethane and 95% of the propane in the feedstock It should be particularly recognized that contemplated configurations according to FIG. 4 can be used for a recovery of up to 75% ethane without appreciable increase in capital and operating costs for ethane recovery when the system can be used for high propane recovery of FIG. 2. In an especially contemplated configuration, the feed tray location to the demethanizer is routed to the top of the demethanizer, and the overhead reflux condenser 105 in FIG. 2 may be converted for use as a side reboiler 116 of the demethanizer in FIG. 4. Additional side-reboilers, and external refrigeration may be used to improve the overall energy efficiency. The demethanizer overhead reflux system is bypassed in this operation and the demethanizer now operates as a reboiled stripper (as compared to a fractionator during propane recovery). The basic equipment design and arrangement in the upstream system is maintained as in FIG. 2, but with a lower operating temperature. The absorber overhead operates then at a lower temperature of about −100° F. to about −130° F., and the feed temperature to the demethanizer is at a lower temperature of about −100° F. to about −120° F.

It should further be appreciated that the previously known recovery plants designed for propane recovery can recover ethane in a range of 20% to 40%. In contrast, configurations according to the inventive subject matter, with minor changes in operation and process parameters, can be economically used for ethane recovery up to 75%. Moreover, the ethane produced in previously known recovery plants designed for ethane recovery usually contains 2–6% $CO_2$. In contrast, configurations according to the inventive subject matter will allow ethane recovery in which the $CO_2$ is present in the ethane in an amount of less than 500 ppm, and more typically less than 350 ppm.

With respect to all components of contemplated configurations (e.g., heat exchangers, pumps, valves, compressors, expanders, refluxed absorbers, de-ethanizers, etc.) it should be appreciated that all known and commercially available components are suitable for use in conjunction with the teachings presented herein. It is farther generally contemplated that configurations according to the inventive subject matter may find wide applicability in gas plant applications where high propane recovery is desirable, and feed gas is available at pressure greater than 550 psig. Moreover, such configurations may advantageously reduce equipment and operating costs, especially where turboexpander technology would necessitate feed gas and/or residue gas compression. For gas plant applications where energy cost is relatively high and propane value compared to fuel value is marginal, it is contemplated that preferred design configurations greatly reduce the overall energy compression costs by operating the absorber between 600 to 750 psig while maintaining the propane recovery between 85% to 95%. Furthermore, it should be appreciated that by combining the reflux absorber and de-ethanizer in a single column as shown in FIG. 6, the overall plot space requirement maybe reduced, which may result in substantial cost savings in modular and platform design.

EXAMPLES

Operations of gas processing plants according to FIGS. 1, 2, 3, 4, and 5 were computer simulated using process simulator HYSYS, and Tables 1, 2, 3, 4, and 5 below summarize exemplary component flow, pressures and temperatures in the configurations as shown in FIGS. 1–5, respectively.

Furthermore, calculations were performed to project the heat composite curve for the heat exchanger 100 in plant configuration according to FIG. 2, the heat exchanger 100 in plant configuration according to FIG. 4, and the side heat exchanger 116 in plant configuration according to FIG. 4, and the results are depicted in FIGS. 2A, 4A, and 4B, respectively. The energy efficiencies of these inventions are very high that are demonstrated by the relatively close temperature approaches of these composite curves.

Thus, specific embodiments and applications for high propane recovery processes and configurations have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A gas processing plant comprising:
    a refluxed absorber operating at a first pressure, producing a bottoms product stream and receiving a feedstock and an absorber reflux stream;
    a distillation column fluidly coupled to the absorber, receiving a distillation column feed stream, producing a distillation column overhead stream, and operating at a second pressure that is at least 100 psi lower an the first pressure; and
    wherein at least a portion of the bottoms product stream is expanded and provides cooling for at least one of the absorber reflux stream and the distillation column feed stream; and
    wherein the distillation column overhead stream is separated into a fluid portion that provides reflux for the distillation column an a gaseous portion that is liquefied and provides the absorber reflux stream.

2. The gas processing plant of claim 1 wherein the distillation column comprises a de-ethanizer column.

3. The gas processing plant of claim 2 wherein the feedstock is at a pressure of between 1000 psig and 2000 psig.

4. The gas processing plant of claim 3 wherein at least a portion of the feedstock is expanded in a turboexpander.

5. The gas processing plant of claim 3 wherein the bottoms product stream has a pressure and wherein expanding the bottoms product stream reduces the bottoms product stream pressure in a range of 100–250 psi.

6. The gas processing plant of claim 3 wherein the expanded bottoms product stream has a temperature between −95° F. to −125° F.

7. The gas processing plant of claim 3 wherein the expanded absorber bottoms product stream is fed as the distillation column feed stream in to the distillation column at a position that is at least three trays below an upmost tray of the distillation column.

8. The gas processing plant of claim 3 wherein the expanded bottoms product stream further provides cooling for a distillation column overhead stream.

9. The gas processing plant of claim 3 wherein the distillation column produces a distillation column overhead stream that is compressed, cooled, and fed into the absorber as the absorber reflux stream.

10. The gas processing plant of claim 3 wherein the feedstock comprises propane, and wherein the distillation column produces a distillation column product stream that comprises at least 95% of the propane in the feedstock.

11. The gas processing plant of claim 2 wherein the feedstock is at a pressure of between 550 psig and 800 psig.

12. The gas processing plant of claim 11 wherein the feedstock is fed into the absorber without passing through a turboexpander.

13. The gas processing plant of claim 11 wherein the bottoms product stream has a pressure and wherein expanding the bottoms product stream reduces bottoms product stream pressure in a range of 100–250 psi.

14. The gas processing plant of claim 11 wherein the bottoms product stream has a temperature between −50° F. to −70° F.

15. The gas processing plant of claim 11 wherein the expanded bottoms product stream is fed as the distillation column feed stream into the distillation column at a position that is at least three trays below an upmost tray in the distillation column.

16. The gas processing plant of claim 11 wherein at least a portion of the feedstock is fed into a lower section of the distillation column.

17. The gas processing plant of claim 11 further comprising an external refrigeration coupled to the distillation column.

18. The gas processing plant of claim 1 wherein the distillation column comprises a demethanizer.

19. The method of claim 18 wherein the feedstock is at a pressure of between 1000 psig and 2000 psig.

20. The gas processing plant of claim 18 wherein at least a portion of the feedstock is expanded in a turboexpander.

21. The gas processing plant of claim 18 wherein the bottoms product stream has a pressure and wherein expanding the bottoms product stream reduces the bottoms product stream pressure in a range of 100–250 psi.

22. The gas processing plant of claim 18 wherein the expanded bottoms product stream has a temperature between −95° F. to −125° F.

23. The gas processing plant of claim 18 wherein the expanded bottoms product stream is fed as the distillation column feed stream into the distillation column.

24. The gas processing plant of claim 18 wherein the distillation column produces a methane rich distillation column overhead stream that is compressed, cooled, and fed into the absorber as the absorber reflux stream.

25. The gas processing plant of claim 18 wherein the distillation column produces a distillation column product stream that comprises no more than 500 ppm carbon dioxide.

26. The gas processing plant of claim 18 wherein the feedstock is split into a first portion and a second portion, and wherein an external refrigeration cools at least part of the first portion.

27. The gas processing plant of claim 26 further comprising at least one side reboiler coupled to the distillation column, wherein the at least one side reboiler is fluidly coupled to the demethanizer between a top tray an a position eight trays below the top tray, provides heat duty for stripping $CO_2$ from demethanizer product stream, provides reboiling of the distillation column, and further provides cooling of the first portion of the feedstock.

28. The gas processing plant of claim 1, wherein the absorber and the distillation column are configured into a single tower configuration.

* * * * *